(12) United States Patent
Liu

(10) Patent No.: US 10,934,880 B1
(45) Date of Patent: Mar. 2, 2021

(54) ELECTRICAL GENERATION FROM TURBINE ENGINES

(71) Applicant: THE BOEING COMPANY, Chicago, IL (US)

(72) Inventor: Shengyi Liu, Sammamish, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/560,550

(22) Filed: Sep. 4, 2019

(51) Int. Cl.
| | |
|---|---|
| *F01D 15/10* | (2006.01) |
| *H02K 7/18* | (2006.01) |
| *H02K 11/04* | (2016.01) |
| *H02K 47/02* | (2006.01) |
| *B64D 27/10* | (2006.01) |
| *B64D 29/00* | (2006.01) |
| *F02C 7/36* | (2006.01) |
| *B64D 33/04* | (2006.01) |

(52) U.S. Cl.
CPC ............ *F01D 15/10* (2013.01); *B64D 27/10* (2013.01); *B64D 29/00* (2013.01); *B64D 33/04* (2013.01); *F02C 7/36* (2013.01); *H02K 7/1823* (2013.01); *H02K 11/046* (2013.01); *H02K 47/02* (2013.01); *B64D 2221/00* (2013.01); *F05D 2220/323* (2013.01); *F05D 2220/764* (2013.01)

(58) Field of Classification Search
CPC ...... F01D 15/10; H02K 11/046; H02K 47/02; H02K 7/1823; F02C 7/36; B64D 29/00; B64D 33/04; B64D 27/10; B64D 2221/00; F05D 2220/323; F05D 2220/764
USPC .......................................................... 290/52
See application file for complete search history.

(56) References Cited

U.S. PATENT DOCUMENTS

| | | | |
|---|---|---|---|
| 5,595,474 A | 1/1997 | Girard | |
| 2005/0029887 A1* | 2/2005 | Fecera | H02K 53/00 310/156.32 |
| 2012/0286516 A1* | 11/2012 | Chong | H02K 7/1823 290/52 |
| 2014/0328668 A1 | 11/2014 | Anthony | |

(Continued)

FOREIGN PATENT DOCUMENTS

GB         2568093-     *  5/2019   .............. F02C 3/113

OTHER PUBLICATIONS

Extended European Search Report for Application No. 20182212. 9-1007 dated Dec. 16, 2020.

*Primary Examiner* — Charles Reid, Jr.
(74) *Attorney, Agent, or Firm* — Patterson + Sheridan, LLP

(57) ABSTRACT

The present disclosure provides an electrical generator within an engine that includes a permanent magnet that emits a first magnetic field and is disposed on a first shaft; a first winding connected to a second shaft such that the first winding is positioned within the first magnetic field; a field winding disposed on the second shaft such that the field winding generates a second magnetic field that rotates as first shaft rotates relative to the second shaft; a second winding disposed on the first shaft, the second winding being positioned to receive the second magnetic field and provide a resonant emitter with an electrical power input to generate a third magnetic field when the first shaft rotates relative to the second shaft; and a resonant receiver disposed on an enclosure of the engine, positioned to receive the third magnetic field and convert the third magnetic field into an electrical output.

20 Claims, 10 Drawing Sheets

(56) References Cited

U.S. PATENT DOCUMENTS

| | | | |
|---|---|---|---|
| 2015/0244303 A1* | 8/2015 | Gao | H02P 31/00 |
| | | | 290/32 |
| 2018/0354631 A1* | 12/2018 | Adibhatla | F02K 5/00 |
| 2019/0136768 A1 | 5/2019 | Harvey | |
| 2019/0165708 A1* | 5/2019 | Smith | H02P 9/04 |
| 2019/0181689 A1 | 6/2019 | Oyama et al. | |
| 2020/0240331 A1* | 7/2020 | Kupratis | F01D 25/36 |

* cited by examiner

ELECTRICAL GENERATION FROM TURBINE ENGINES

FIELD

Aspects of the present disclosure generally relate to electrical energy generation from turbine engines. More particularly, the present disclosure relates to converting the mechanical energy from turbine engines, as may be used in aircraft and other vehicles, into electrical energy and transferring that energy to the associated vehicle via electromagnetic fields.

BACKGROUND

Various vehicles use various combinations of engines to provide motive thrust and maneuvering control to those vehicles. For example, aircraft may use engines that incorporate a turbine to power a jet or a propeller. Turbine engines include several rotating components to provide motive thrust and air/gas compression. Electrical generators connected to the rotating components of the turbine engine can extract and convert the mechanical rotational energy into electrical energy that is used to power various onboard systems for the associated vehicle. Due to the temperatures, speeds of rotation, and airflow within the turbine engine, physical components used to extract rotational energy from the rotating engine components may be subject to high replacement rates due to wear on the individual parts and to avoid introducing reliability issues to other engine components. Additionally, due to the location of the energy extracting components in the turbine engines, repair and replacement may be difficult or time consuming to accomplish.

SUMMARY

The present disclosure provides a system in one aspect, the system including: a permanent magnet that emits a first magnetic field and is disposed on a first spool shaft of a turbine engine; a first armature winding connected to a second spool shaft of the turbine engine such that the first armature winding is positioned within the first magnetic field; a main field winding disposed on the second spool shaft such that the main field winding generates a second magnetic field that rotates as the first spool shaft rotates relative to the second spool shaft; a second armature winding disposed on the first spool shaft, the second armature winding being positioned to receive the second magnetic field and provide a resonant emitter with an electrical power input to generate a third magnetic field of at least a predefined frequency when the first spool shaft rotates relative to the second spool shaft; and a resonant receiver disposed on an enclosure of the turbine engine, positioned to receive the third magnetic field and convert the third magnetic field into an electrical power output.

In various aspects, in combination with any example system above or below, the system the first spool shaft is a higher-pressure shaft, wherein the second spool shaft is a lower-pressure shaft, and wherein the higher-pressure shaft rotates at a first speed that is greater than a second speed at which the lower-pressure shaft rotates. In other aspects, in combination with any example system above or below, the first spool shaft is a lower-pressure shaft, wherein the second spool shaft is a higher-pressure shaft, and wherein the higher-pressure shaft rotates at a first speed that is greater than a second speed at which the lower-pressure shaft rotates In one aspect, in combination with any example system above or below, the system further includes a rectifier disposed on the second spool shaft between the first armature winding and the main field winding that converts multiphase Alternating Current from the first armature winding generated by the first magnetic field into an electrical power input for the main field winding to generate the second magnetic field.

In one aspect, in combination with any example system above or below, the system further includes a high frequency converter disposed between the second armature winding and the resonant emitter that provides the electrical power input at a higher frequency to the resonant emitter than the second magnetic field is received by the second armature winding. In some such aspects, the higher frequency is greater than a difference in rotational speed between the first spool shaft and the second spool shaft and is based on a power transfer efficiency between the resonant emitter and the resonant receiver.

In one aspect, in combination with any example system above or below, the electrical power output includes a plurality of electrical phases based on a number of phases defined in the second armature winding.

In one aspect, in combination with any example system above or below, the system further includes a power control unit disposed in the enclosure and connected to a power distribution bus for a vehicle.

The present disclosure provides a turbine engine in one aspect, the turbine engine including: an enclosure, defining: an air intake at an upstream end; a compression section downstream of the air intake; a combustion section downstream of the compression section; a turbine section downstream of the combustion section; and an exhaust at a downstream end; a first shaft coupled with a first compressor of the compression section and with a first turbine of the turbine section, wherein the first shaft is configured to rotate at a first rotational speed; a second shaft coupled with a second compressor of the compression section and with a second turbine of the turbine section and running coaxially with the first shaft, wherein the second shaft is configured to rotate at a second rotational speed; a first armature winding, connected to one of the first shaft and the second shaft; a permanent magnet, emitting a first magnetic field that is configured to rotate relative to the first armature winding at a differential rotational speed corresponding to a difference between the first rotational speed and the second rotational speed and induce a first current in the first armature winding; a first electromagnet, connected to the first armature winding, configured to emit a second magnetic field when powered by the first current; a second armature winding, connected to a different one of the first shaft and the second shaft than the first armature winding, configured to rotate relative to the first electromagnet at the differential rotational speed and to have a second current induced on the second armature winding by the second magnetic field; a resonant emitter, connected to the second armature winding, configured to generate a third magnetic field of at least a predefined frequency when powered by the second current; and a resonant receiver disposed on the enclosure of the turbine engine, positioned to receive the third magnetic field and convert the third magnetic field into an electrical power output.

In various aspects, in combination with any example turbine engine above or below, the turbine engine further includes a third shaft coupled with a third compressor of the compression section downstream of the first compressor and the second compressor and with a third turbine of the turbine section upstream of the first turbine and the second turbine, wherein the third shaft runs coaxially to the second shaft, and is configured to rotate at a third rotational speed that is greater than the first rotational speed and the second rotational speed. In some such aspects, the turbine engine further includes a secondary first armature winding, connected to one of the third shaft and the second shaft; a secondary permanent magnet, emitting a secondary first magnetic field that is configured to rotate relative to the secondary first armature winding at a secondary differential rotational speed corresponding to a secondary difference between the third rotational speed and the second rotational speed and induce a secondary first current in the secondary first armature winding; a secondary first electromagnet, connected to the secondary first armature winding, configured to emit a secondary second magnetic field when powered by the secondary first current; a secondary second armature winding, connected to a different one of the third shaft and the second shaft than the secondary first armature winding, configured to rotate relative to the secondary first electromagnet at the secondary differential rotational speed and to have a secondary second current induced on the secondary second armature winding by the secondary second magnetic field; a secondary resonant emitter, connected to the secondary second armature winding, configured to generate a secondary third magnetic field of at least a secondary predefined frequency when powered by the secondary second current; and a secondary resonant receiver disposed on the enclosure of the turbine engine, positioned to receive the secondary third magnetic field and convert the secondary third magnetic field into a secondary electrical power output. In other aspects, in combination with any example turbine engine above or below, the turbine engine further includes a third shaft coupled with a third compressor of the compression section upstream of the first compressor and the second compressor and with a third turbine of the turbine section downstream of the first turbine and the second turbine, wherein the third shaft runs coaxially to the second shaft, and is configured to rotate at a third rotational speed that is less than the first rotational speed and the second rotational speed. In some such aspects, the turbine engine further includes a secondary first armature winding, connected to one of the third shaft and the second shaft; a secondary permanent magnet, emitting a secondary first magnetic field that is configured to rotate relative to the secondary first armature winding at a secondary differential rotational speed corresponding to a secondary difference between the third rotational speed and the second rotational speed and induce a secondary first current in the secondary first armature winding; a secondary first electromagnet, connected to the secondary first armature winding, configured to emit a secondary second magnetic field when powered by the secondary first current; a secondary second armature winding, connected to a different one of the third shaft and the second shaft than the secondary first armature winding, configured to rotate relative to the secondary first electromagnet at the secondary differential rotational speed and to have a secondary second current induced on the secondary second armature winding by the secondary second magnetic field; a secondary resonant emitter, connected to the secondary second armature winding, configured to generate a secondary third magnetic field of at least a secondary predefined frequency when powered by the secondary second current; and a secondary resonant receiver disposed on the enclosure of the turbine engine, positioned to receive the secondary third magnetic field and convert the secondary third magnetic field into a secondary electrical power output.

In one aspect, in combination with any example turbine engine above or below, the turbine engine further includes a nacelle, defining a bypass flow chamber in which the enclosure is disposed; and a transfer cable, disposed in the bypass flow chamber running from the enclosure to electrically connect the resonant receiver to a power distribution bus for a vehicle. In some such aspects, the turbine engine further includes a power control unit disposed within the bypass flow chamber externally to the enclosure and that is electrically connected between the resonant receiver and the transfer cable. In some such aspects, the resonant emitter further comprises: a multiphase armature winding with a predefined number of phase windings, to emit the third magnetic field in a corresponding number of phases; and a high frequency converter, located between the multiphase armature winding and the second armature winding, configured to up convert the second current to at least the predefined frequency.

The present disclosure provides a method in one aspect, the method including: rotating a permanent magnet, emitting a first magnetic field, attached to a first shaft of a turbine engine about the first shaft and relative to a second shaft of the turbine engine to induce a multiphase alternating current in a first armature winding disposed on the second shaft of the turbine engine; powering, via the multiphase alternating current, a first electromagnet disposed on the second shaft to generate a second magnetic field; inducing, by the second magnetic field, a single-phase direct current in a second armature winding disposed on the first shaft, powering, via the single-phase direct current, a resonant emitter to generate a third magnetic field at or above a predefined frequency; and converting the third magnetic field as rotating via a resonant receiver disposed on an enclosure of the turbine engine into an electrical power output.

In one aspect, the above method further includes transferring the electrical power output to an electrical bus of a vehicle.

The present disclosure provides a method in one aspect, the method including: affixing, at an interface region between a first shaft and a second shaft of a turbine engine, a permanent magnet to the first shaft; affixing a first spool shaft assembly, including a first armature winding and a first electromagnet, to the second shaft to place the first armature winding within a first magnetic field emitted by the permanent magnet; affixing a second spool shaft assembly, including a second armature winding and a resonant emitter, to the first shaft relative to the first spool shaft assembly such that the second armature winding is located in relation to the first electromagnet to receive a second magnetic field when rotated relative to the first electromagnet; and affixing a resonant receiver to an interior surface of an enclosure of the turbine engine in relation to the resonant emitter to receive a third magnetic field when the resonant emitter radiates the third magnetic field.

In one aspect of the above method the second spool shaft assembly includes the permanent magnet and the second spool shaft is a lower pressure spool shaft that protrudes from the first spool shaft at the interface region.

BRIEF DESCRIPTION OF THE DRAWINGS

So that the manner in which the above recited features can be understood in detail, a more particular description, briefly summarized above, may be had by reference to example aspects, some of which are illustrated in the appended drawings.

DETAILED DESCRIPTION

The present disclosure provides for power extraction and transfer from the rotational components of a turbine engine via electromagnetic (EM) components that are not in physical contact with one another, but rather extract and convert rotational energy into electrical energy via a series of induced magnetic fields. A permanent magnet affixed to a first shaft in the engine rotates relative to a first armature winding on a second shaft in the engine to induce an electrical current in the first armature when the two shafts rotate relative to one another while the engine is in operation. This induced current, in turn, powers an electromagnet that induces a current in a second armature winding affixed to the first shaft to power a high frequency resonator that produces a third magnetic field with a high frequency to induce a current in receiving circuits located in fixed positions on the case or shell of the engine to thereby transfer power to the electrical systems of the vehicle.

The electromagnetic power transfer components are arranged with radial symmetry around the engine with contact to a single thrust generating component (e.g., a spool core, an enclosure). Airgaps separate the permanent magnet and the first armature winding; the first electromagnet and the second armature winding; and the resonant emitter and the resonant receiver. Because none of the electromagnetic power transfer components are in physical contact with more than one thrust generating component of the engine or another power transfer component connected to a different thrust generating component, such a system may experience less wear and correspondingly lower replacement rates of the power transfer components. Additionally, the electromagnetic components do not transfer power via wires or shafts disposed in the airflow of the turbine engine, and may be relatively lightweight compared to gearboxes and shafts that translate rotational energy to an external generator, thus providing greater mechanical and fuel efficiency for the engine. Moreover, the efficiency of power extraction and transfer via the electromagnetic power transfer components can exceed the efficiency of mechanical power transfer components, thus further improving the efficiency of the engine.

Although the examples provided in the present disclosure primarily illustrate the use the power transfer system in the turbine engines of aircraft, the power transfer system described in the present disclosure may be used in conjunction with turbine engines used in cars, busses, trains, boats, and various other vehicles.

Figure 1A:
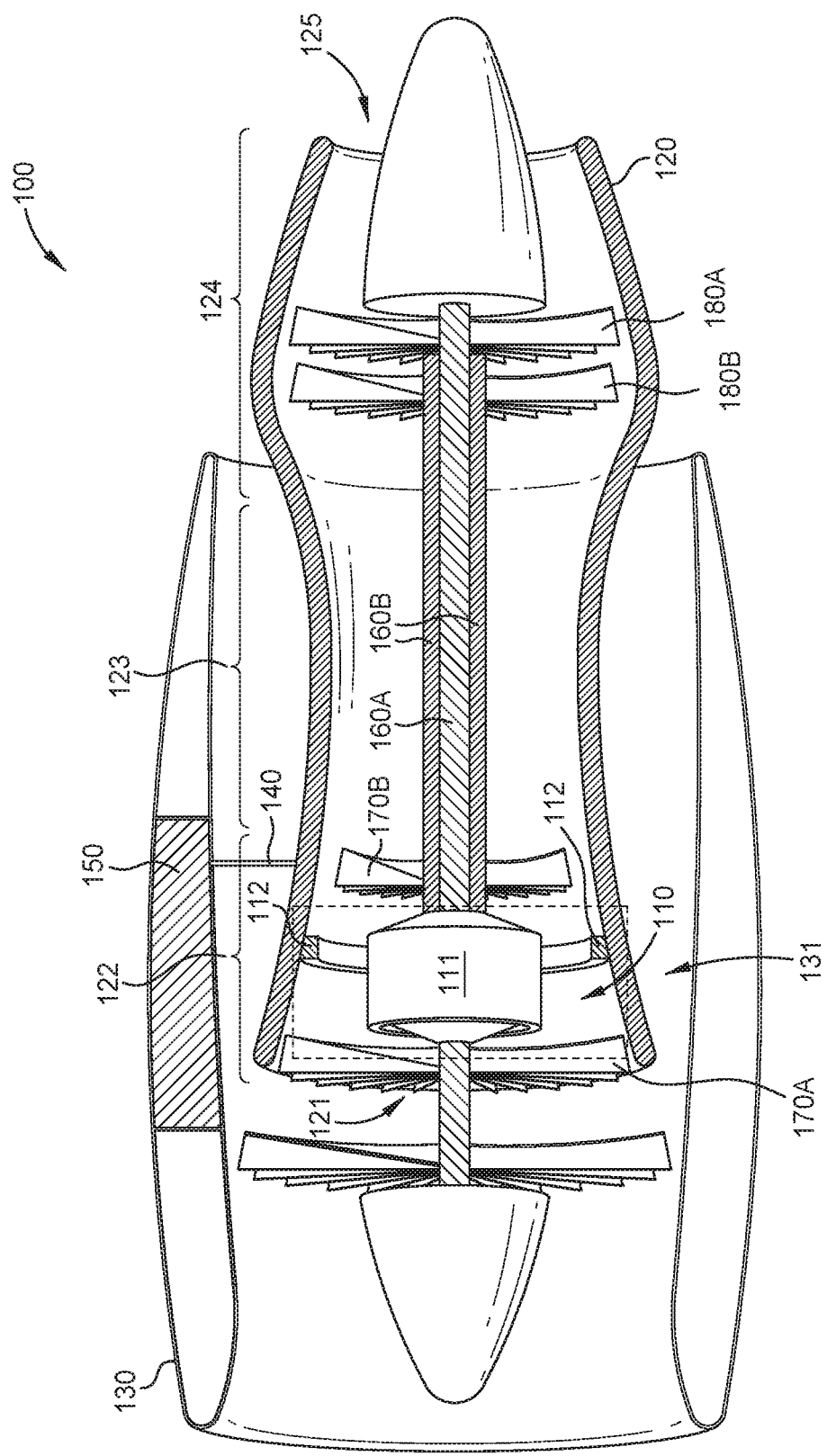
FIGS. 1A and 1B illustrate cross-sectioned turbine engines including one or more electrical generators, according to aspects of the present disclosure.
Figure 1B:
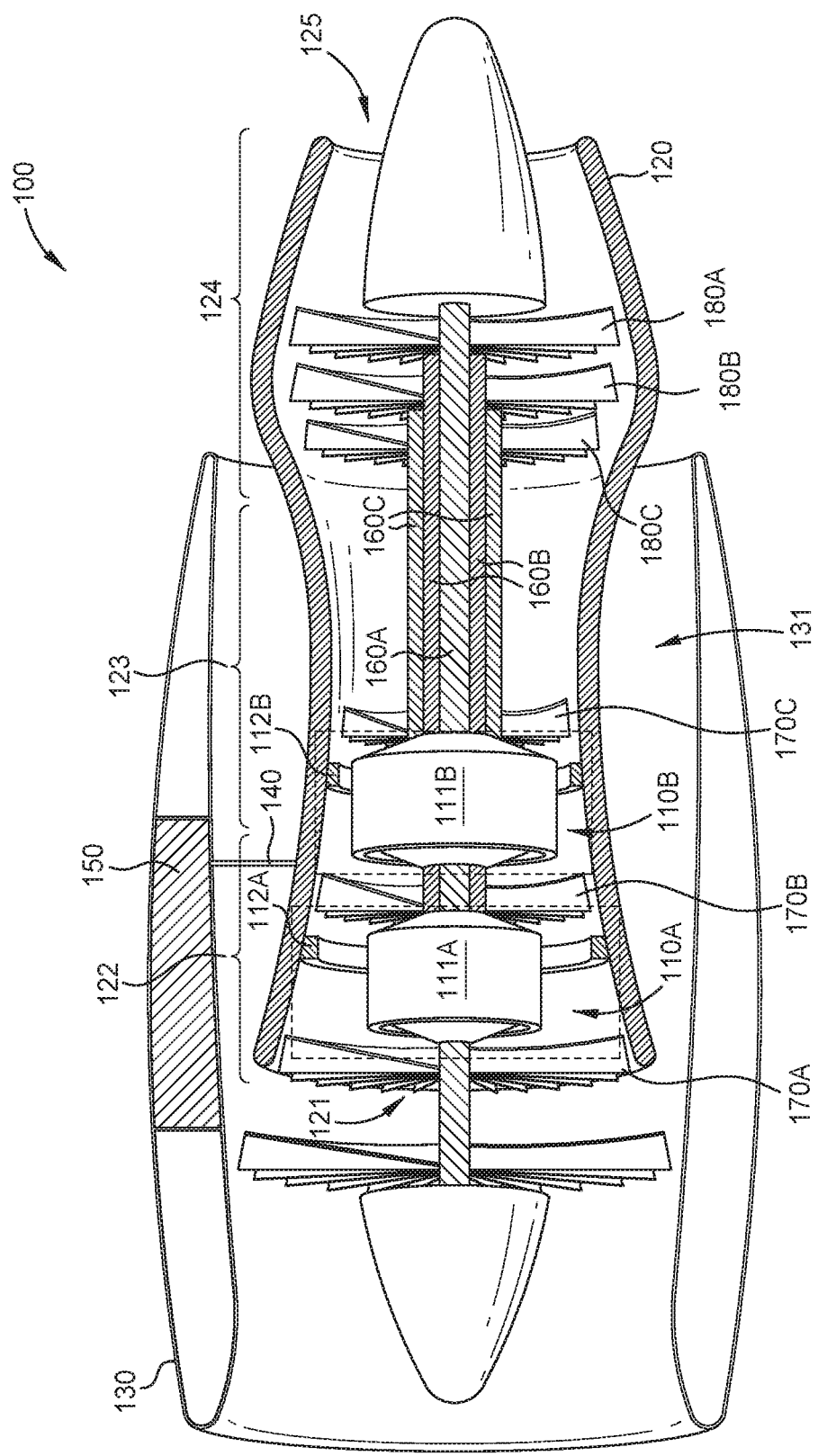

FIGS. 1A and 1B illustrate cross-sectioned turbine engines 100 including one or more electrical generators 110. The turbine engine 100 includes an enclosure 120 defining an air intake 121 at an upstream end, a compression section 122 downstream of the air intake 121, a combustion section 123 downstream of the compression section 122, a turbine section 124 downstream of the combustion section 123, and an exhaust 125 at a downstream end. In various aspects, the enclosure 120 is included inside of a nacelle 130 (also referred to as a housing), and a bypass flow chamber 131 is defined between an outer surface of the enclosure 120 and an inner surface of the nacelle 130 with a transfer cable 140 linking the electrical generators 110 to a power distribution bus 150 or other power transfer mechanism for a vehicle in which the turbine engine 100 is included.

The turbine engine 100 of FIG. 1A includes a first spool shaft 160A (generally, spool shaft or shaft 160) and a second spool shaft 160B, while the turbine engine 100 of FIG. 1B includes a first spool shaft 160A, a second spool shaft 160B, and a third spool shaft 160C. The identified portions 160A, 160B, and/or 160C refer generally to shaft 160. Each shaft 160 extends coaxially with the other shafts 160, and rotate during operation at different rates relative to one another to drive associated compressors 170A-B or 170A-C (generally, compressor 170) and turbines 180A-B or 180A-C (generally, turbine 180) at different rates. For example, a first spool shaft 160A rotates to drive the rotation of a first compressor 170A and a first turbine 180A at a first rotational speed, while a second spool shaft 160B rotates to drive the rotation of a second compressor 170B and second turbine 180B at a second rotational speed. Similarly, in FIG. 1B, a third spool shaft 160C rotates to drive the rotation of a third compressor 170C and a third turbine 180C at a third rotational speed, where the first, second, and third rotational speeds are all different from one another.

The compressors 170 are disposed in the compression section 122 of the enclosure 120, and may each include several fan blades arranged in one or more rows. The turbines 180 are disposed in the turbine section 124 of the enclosure 120, and may each include several fan blades arranged in one or more rows. Although not illustrated, various bearings or low friction surfaces may be located between the shafts 160 to improve rotational characteristics of the shafts 160 (e.g., to reduce friction).

As illustrated in FIG. 1A, the first spool shaft 160A is a low-pressure shaft relative to the high-pressure shaft of the second spool shaft 160B. Accordingly, the first compressor 170A is located upstream of the second compressor 170B, and rotates at a lower rotational speed than the second compressor 170B during operation of the turbine engine 100. Similarly, the first turbine 180A is located downstream of the second turbine 180B, and rotates at a lower rotational speed than the second turbine 180B during operation of the turbine engine 100.

As illustrated in FIG. 1B, the first spool shaft 160A is a low-pressure shaft, the second spool shaft 160B is a medium-pressure shaft, and the third spool shaft 160C is a high-pressure shaft relative to one another. Accordingly, the first compressor 170A is located upstream of the second compressor 170B, which is located upstream of the third compressor 170C, each of which operates at lower rotational speeds than downstream compressors 170 during operation of the turbine engine 100. Similarly, the first turbine 180A is located downstream of the second turbine 180B, which is located downstream of the third turbine 180C, each of which operates at progressively lower rotational speeds than upstream turbines 180 during operation of the turbine engine 100.

Accordingly, a first differential rotational speed exists between the first spool shaft 160A and the second spool shaft 160B (and any components attached thereto) during operation, and, in FIG. 1B, a second differential rotational speed (which may be the same as or different than the first differential rotational speed) exists between the second spool shaft 160B and the third spool shaft 160C (and any components attached thereto).

The electrical generators 110 include electrical extractors 111 affixed to the shafts 160 and electrical distributors 112 affixed to the enclosure 120. The electrical extractors 111 are not physically connected to the electrical distributors 112, but are separated by an empty space and electromagnetically linked during operation by a generated magnetic field. The electrical extractors 111 are located at the interfaces between two shafts 160 and capitalize on the different rotational speeds imparted by the different shafts 160 to extract electrical energy. As illustrated in FIG. 1A, an electrical extractor 111 is located at the interface between the first spool shaft 160A and the second spool shaft 160B. As illustrated in FIG. 1B, a first electrical extractor 111A is located at the interface between the first spool shaft 160A and the second spool shaft 160B, and a second electrical extractor 111B is located at the interface between the second spool shaft 160B and the third spool shaft 160C. Each electrical extractor 111 is associated with a corresponding electrical distributor 112 affixed radially around a corresponding portion of the enclosure 120 (e.g., a first electrical extractor 111A corresponding to a first electrical distributor 112A, a second electrical extractor 111B corresponding to a second electrical distributor 112B). Although not illustrated, in some aspects using a three-shaft design, the turbine engine 100 may include only one electrical generator 110; omitting one of the first electrical generator 110A or the second electrical generator 110B.

Figure 2A:
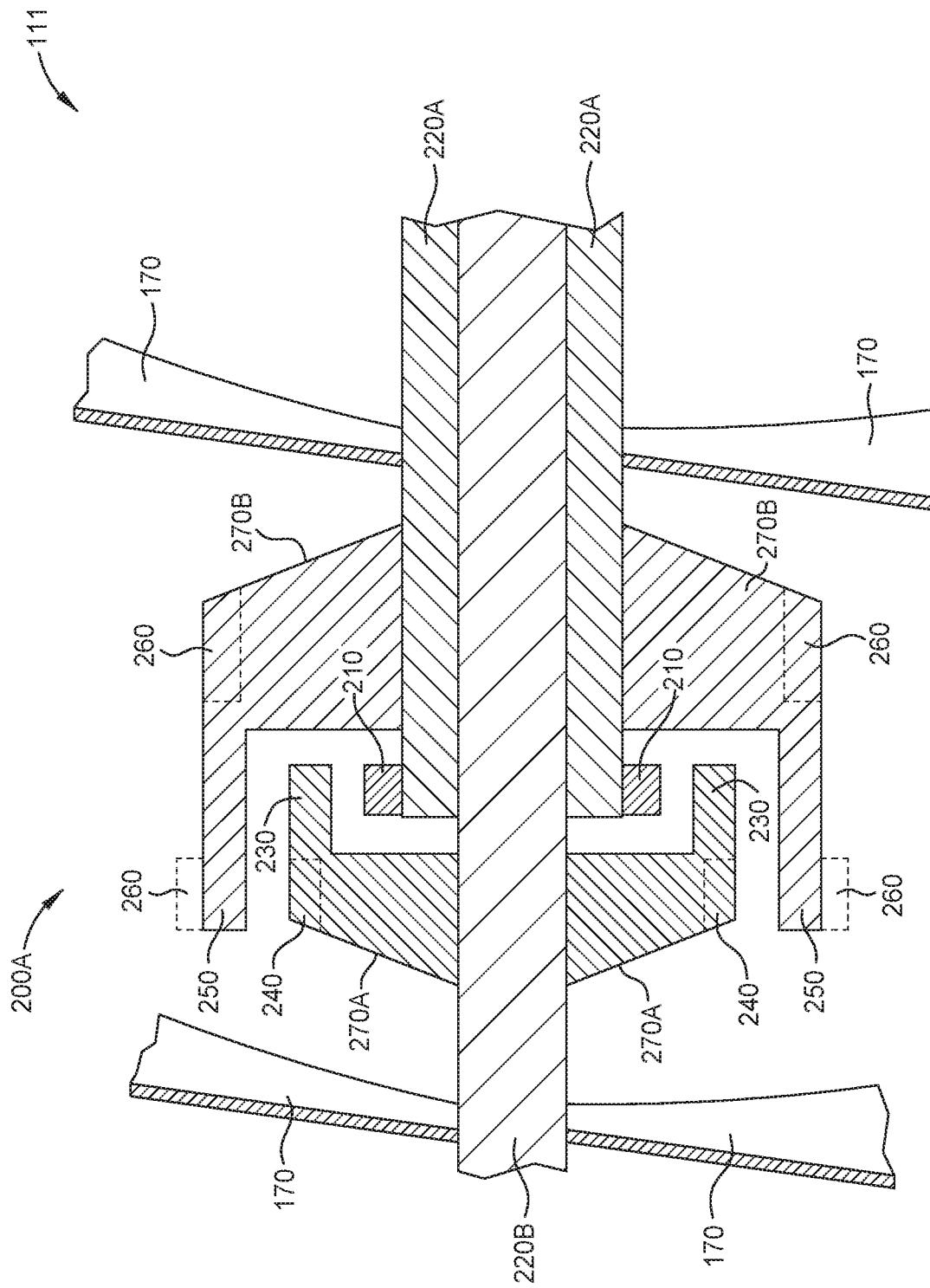
FIGS. 2A and 2B illustrate cross-sectional views of the components of an electrical extractor, according to aspects of the present disclosure.
Figure 2B:
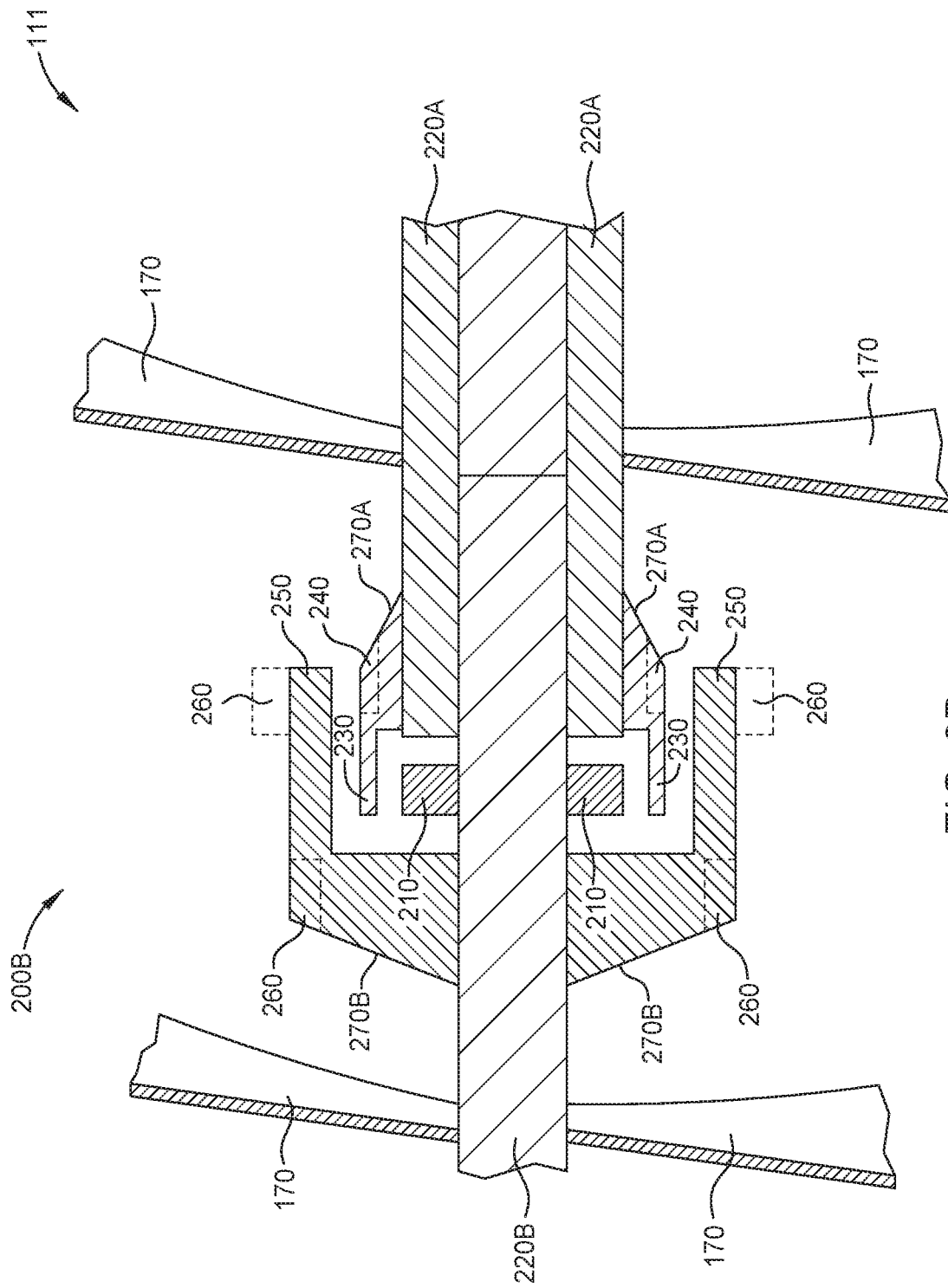

FIGS. 2A and 2B illustrate cross-sectional views of the components of an electrical extractor 111. FIGS. 2A and 2B may be understood in conjunction with FIGS. 3A and 3B, respectively, which illustrate cross-sectional views of the components of an electrical generator 110 and magnetic fields generated therein, according to aspects of the present disclosure. The electrical extractors 111 are located at the interface of two shafts 160 and between the associated compressors 170 thereof. For example, the illustrated electrical extractors 111 may be located between the first compressor 170A and the second compressor 170B on the first spool shaft 160A and the second spool shaft 160B. In another example, the illustrated electrical extractors 111 may be located between the second compressor 170B and the third compressor 170C on the second spool shaft 160B and the third spool shaft 160C.

In various aspects, the components illustrated in FIG. 2A or 2B may belong to a sole electrical extractor 111 (as in FIG. 1A), or to one of a primary or secondary electrical extractor 111 (as in FIG. 1B). In aspects including multiple electrical extractors 111, the individual components may be arranged both according to FIG. 2A, both according to FIG. 2B, or one according to FIG. 2A and one according to FIG. 2B. As used herein, when differentiating components between multiple electrical generators 110, the components of one electrical generator 110 may be distinguished by referring to those components as "secondary" components. For example, a first electrical extractor 111A includes a primary permanent magnet 210, and a second electrical extractor 111B includes a secondary permanent magnet 210. In another example, a first electrical extractor 111A includes a primary first shaft 160A and a primary second shaft 160B, and a second electrical extractor 111B includes a secondary first shaft 160A (which may be the same shaft 160 as the primary first shaft 160A or the primary second shaft 160B) and a secondary second shaft 160B (which may which may be the same shaft 160 as the primary first shaft 160A or the primary second shaft 160B).

FIG. 2A illustrates a first component arrangement 200A for an electrical extractor 111, according to aspects of the present disclosure, in which a permanent magnet 210 is positioned on a higher-pressure shaft 220A at an interface between two shafts 220. The permanent magnet 210 may include a plurality of magnets arranged radially around the higher-pressure shaft 220A to emit a plurality of first magnetic fields 310, which are illustrated in greater detail in regard to FIG. 3A.

As illustrated in FIG. 2A, a first armature winding 230 and a main field winding 240 (also referred to as a first electromagnet) are included in a first spool shaft assembly 270A (generally, spool shaft assembly 270; particularly, higher-pressure or lower-pressure spool shaft assembly 270) that is connected to the lower-pressure shaft 220B. The first spool shaft assembly 270A positions the first armature winding 230 within a predefined field strength of the first magnetic field 310. The first armature winding 230 is arranged radially around, but not in physical contact with, the higher-pressure shaft 220A and the permanent magnet 210. In various aspects, the first armature winding 230 produces a first current ($I_1$) as a multiphase alternating current, which is converted into a second current ($I_2$) of a single phase direct current, which powers a main field winding 240 to generate a second magnetic field 320, which is illustrated in greater detail in regard to FIG. 3A. The first spool shaft assembly 270A positions the main field winding 240 outside of a predefined field strength of the first magnetic field 310, and accordingly, the permanent magnet 210 is positioned outside of a predefined field strength of the second magnetic field 320. In various aspects, rectifier circuitry is included between the first armature winding 230 and the main field winding 240.

As illustrated in FIG. 2A, a second armature winding 250 and a resonant emitter 260 (also referred to as a second electromagnet) are included in a second spool shaft assembly 270B that is connected to the same higher-pressure shaft 220A that the permanent magnet 210 is connected to. In various aspects, the resonant emitter 260 may be placed downstream of the second armature winding 250 along the axis of the shafts 220, or may be placed between the second armature winding 250 and the resonant receiver 340 to reduce the space requirements for placing the electrical extractor 111 along the shafts 220 between the compressors 170. In some aspects, the permanent magnet 210 is also included in the second spool shaft assembly 270B, but the permanent magnet 210 may be separately attached to the higher-pressure shaft 220A in other aspects.

The second spool shaft assembly 270B positions the second armature winding 250 within a predefined field strength of the second magnetic field 320. The second armature winding 250 is arranged radially around, but not in physical contact with, the lower-pressure shaft 220B and the first spool shaft assembly 270A. In various aspects, the second armature winding 250 produces a third current ($I_3$) as a multiphase alternating current, which powers the resonant emitter 260 to generate a third magnetic field 330, which is illustrated in greater detail in regard to FIG. 3A. The second spool shaft assembly 270B positions the resonant emitter 260 outside of a predefined field strength of the first magnetic field 310 and the second magnetic field 320 and, accordingly, the permanent magnet 210 and the first armature winding 230 are positioned outside of a predefined field strength of the third magnetic field 330.

Figure 3A:
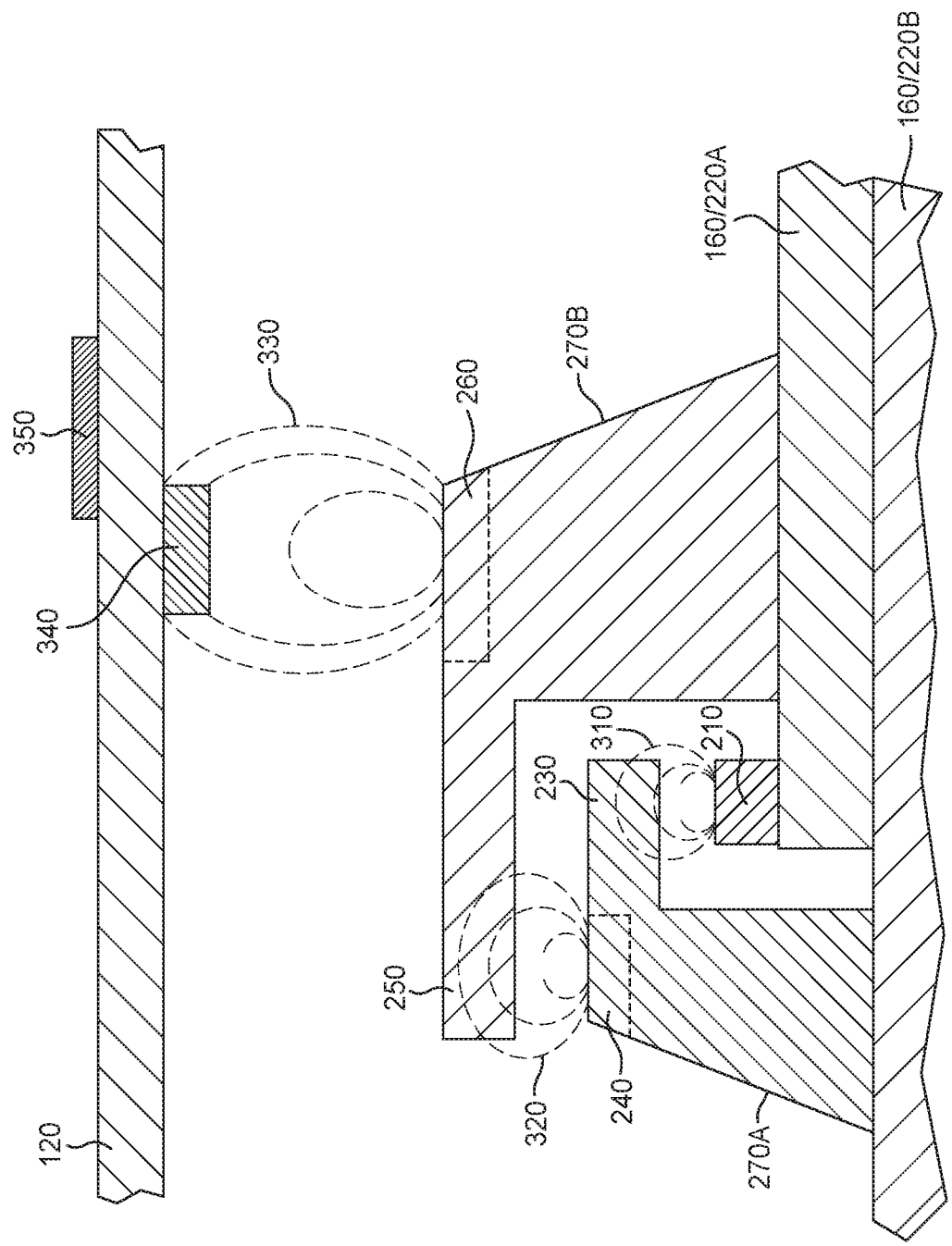
FIGS. 3A and 3B illustrate cross-sectional views of the components of an electrical generator and magnetic fields generated therein, according to aspects of the present disclosure.

As illustrated in FIG. 3A, a resonant receiver 340 of an electrical distributor 112 is affixed to an interior surface of the enclosure 120, and is positioned in relation to the resonant emitter 260 to receive at least a predefined field strength of the third magnetic field 330. The resonant receiver 340 is arranged with radial symmetry around the enclosure 120, and is configured to receive the third magnetic field 330 to produce a fourth multiphase alternating current (14 that may be provided to a bus or other electrical distribution system of a vehicle.

FIG. 2B illustrates a second component arrangement 200B for an electrical extractor 111, according to aspects of the present disclosure, in which a permanent magnet 210 is positioned on a lower-pressure shaft 220B at an interface between two shafts 220. The permanent magnet 210 may include a plurality of magnets arranged radially around the lower-pressure shaft 220B to emit a plurality of first magnetic fields 310, which are illustrated in greater detail in regard to FIG. 3B.

As illustrated in FIG. 2B, a first armature winding 230 and a main field winding 240 (also referred to as a first electromagnet) are included in a first spool shaft assembly 270A that is connected to the higher-pressure shaft 220A. The first spool shaft assembly 270A positions the first armature winding 230 within a predefined field strength of the first magnetic field 310. The first armature winding 230 is arranged radially around, but not in physical contact with, the lower-pressure shaft 220B and the permanent magnet 210. In various aspects, the first armature winding 230 produces a first current ($I_1$) as a multiphase alternating current, which is converted into a second current ($I_2$) of a single phase direct current, which powers a main field winding 240 to generate a second magnetic field 320, which is illustrated in greater detail in regard to FIG. 3B. The first spool shaft assembly 270A positions the main field winding 240 outside of a predefined field strength of the first magnetic field 310, and accordingly, the permanent magnet 210 is positioned outside of a predefined field strength of the second magnetic field 320. In various aspects, rectifier circuitry is included between the first armature winding 230 and the main field winding 240.

As illustrated in FIG. 2B, a second armature winding 250 and a resonant emitter 260 (also referred to as a second electromagnet) are included in a second spool shaft assembly 270B that is connected to the same lower-pressure shaft 220B that the permanent magnet 210 is connected to. In various aspects, the resonant emitter 260 may be placed upstream of the second armature winding 250 along the axis of the shafts 220, or may be placed between the second armature winding 250 and the resonant receiver 340 to reduce the space requirements for placing the electrical extractor 111 along the shafts 220 between the compressors 170. In some aspects, the permanent magnet 210 is also included in the second spool shaft assembly 270B, but the permanent magnet 210 may be separately attached to the lower-pressure shaft 220B in other aspects.

The second spool shaft assembly 270B positions the second armature winding 250 within a predefined field strength of second magnetic field 320. The second armature winding 250 is arranged radially around, but not in physical contact with, the higher-pressure shaft 220A and the first spool shaft assembly 270A. In various aspects, the second armature winding 250 produces a third current ($I_3$) as a multiphase-phase alternating current, which powers the resonant emitter 260 to generate a third magnetic field 330, which is illustrated in greater detail in regard to FIG. 3B. The second spool shaft assembly 270B positions the resonant emitter 260 outside of a predefined field strength of the first magnetic field 310 and the second magnetic field 320, and accordingly, the permanent magnet 210 and the first armature winding 230 are positioned outside of a predefined field strength of the third magnetic field 330.

Figure 3B:
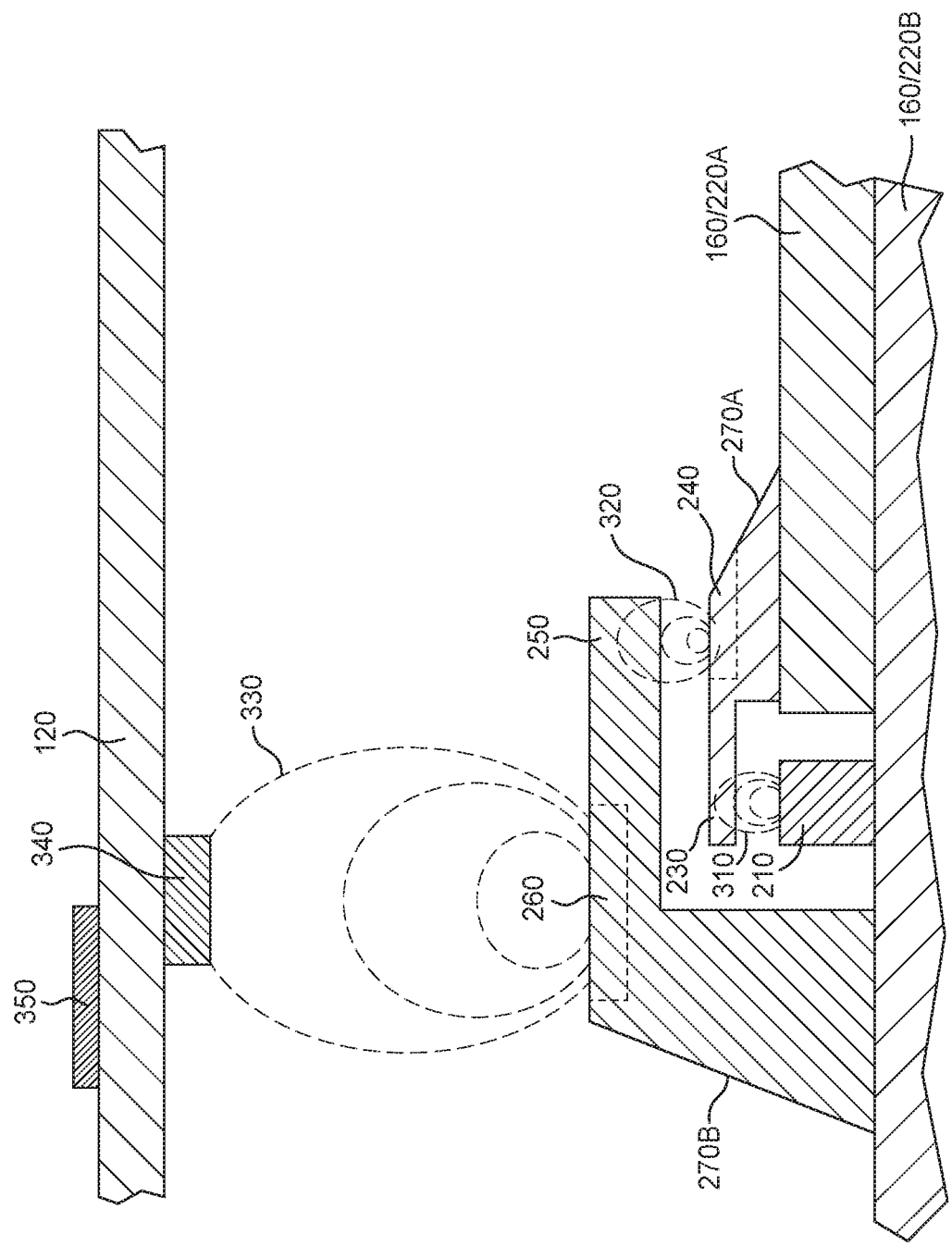

As illustrated in FIG. 3B, a resonant receiver 340 is affixed to an interior surface of the enclosure 120, and is positioned in relation to the resonant emitter 260 to receive at least a predefined field strength of the third magnetic field 330. The resonant receiver 340 is arranged with radial symmetry around the enclosure 120, and is configured to receive the third magnetic field 330 to produce a fourth multiphase alternating current ($I_4$) that may be provided to a bus or other electrical distribution system of a vehicle.

During operation of the turbine engine 100 in which the components are disposed, the rotational forces imparted by combustion for producing thrust cause the shafts 160 and attached EM components to rotate relative to one another and the stationary enclosure 120. Due to the differential in the rotational speeds of the higher-pressure shaft 160A and the lower-pressure shaft 160B, the first magnetic field 310 rotates relative to the first armature winding 230, the second magnetic field 320 rotates relative to the second armature winding 250, and the third magnetic field 330 rotates relative to the (nominally stationary) resonant receiver 340. Accordingly, electrical energy is extracted from the rotational forces of the shafts 160 and transferred between the various assemblies via magnetic fields instead of via mechanical transfer components, gears, or the like.

The relative sizes and positions of the electromagnetically coupled components in FIGS. 2A, 2B, 3A, and 3B have been illustrated for the easy identification and differentiation of the reader. However, in various aspects, a fabricator may alter the relative sizes, shapes, and orientations of these components based on the physical properties of the turbine engine 100 in which the components are installed (e.g., length, circumference, rotational torque, operating temperature), the desired power characteristics for the extracted power (e.g., number of power phases, voltage/current levels), and the like. The lengths of the components along the axis of the shafts 220 are determined by the torque and/or power rating requirements of the vehicle from the turbine engine 100, and the relative sizes and distances of individual components are sized to optimize torque production from the turbine engine 100 and power transfer efficiency in the electrical generator 110 within the physical confines of the turbine engine 100. A fabricator will therefore understand the Figures to be sized/shaped for exemplifying the concepts of operation, and not for implementation purposes, which are dictated by the power requirements, thrust requirements, and material properties of the components.

For example, a fabricator can design the permanent magnet 210 and the first armature winding 230 to be shorter than the other sections of the electrical generator 110 to generate and provide an excitation current at a relatively low level (e.g., a rectified DC current at around 1-50 Amperes (A)). The main field winding 240 carries the excitation current to produce the second magnetic field 320, and to optimize torque in the system, the fabricator can design the main field winding 240 to be equal in length to the second armature winding 250, which in turn is sized to be as long as possible within the space allotment within the turbine engine 100. For example, the second armature winding 250 may run the entire available length of the spool shaft assembly 270 (less any supporting components) in which the second armature winding 250 is deployed. Similarly, to optimize the power transfer capabilities of the electrical extractor 111, the resonant emitter circuit 260 may be sized and positioned to overlay the second armature winding 250 so that the resonant emitter circuit 260 extends over the entire length of the electrical extractor 111, and the length and position of the receiver circuit 340 is matched to overlay the resonant emitter circuit 260.

Figure 4:
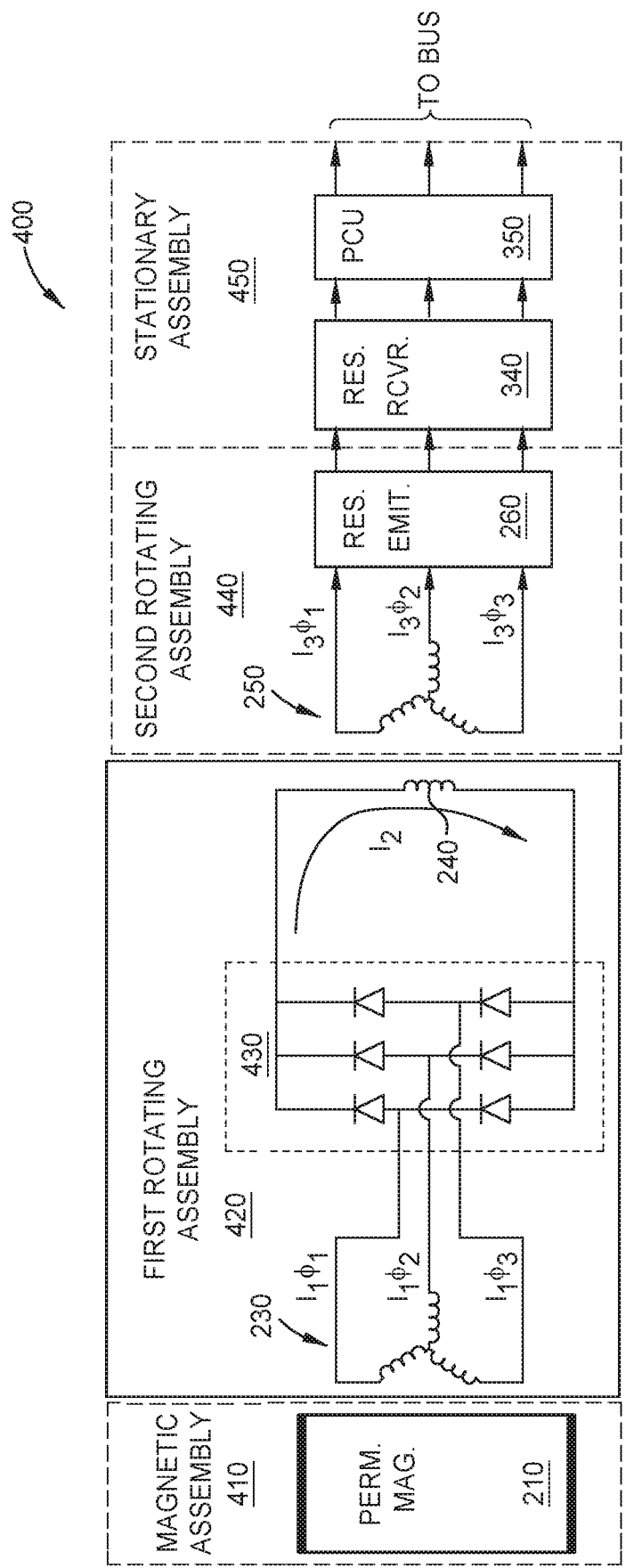
FIG. 4 is a circuit diagram of the electromagnetic components of an electrical generator, according to aspects of the present disclosure.

FIG. 4 is a circuit diagram 400 of the EM components of an electrical generator 110. The magnetic assembly 410 that includes the permanent magnet(s) 210 is arranged in magnetic contact, but not physical contact, with a first rotating assembly 420 that includes the first armature winding 230, a rectifier 430, and the main field winding 240. As used herein, magnetic contact describes the state in which a magnetic field produced by a permanent or electromagnet is of at least a predefined strength between two components. The rectifier 430, which may include a plurality of diodes, is provided between the first armature winding 230 and the main field winding 240 to convert the first current ($I_1$) from a multiphase AC output of the first armature winding 230 to a second current ($I_2$) of a single-phase DC input to power the electromagnet of the main field winding 240. The first armature winding 230 and rectifier 430 shown in FIG. 4 are provided as an example of a three-phase construction, but in other aspects, more or fewer than three phases may be used.

The first rotating assembly 420 is arranged in magnetic contact, but not physical contact, with a second rotating assembly 440 via the main field winding 240 and the second armature winding 250. A second magnetic field 320 produced by the main field winding 240, via the second current ($I_2$), induces a third current ($I_3$) on the second armature winding 250. The second armature winding 250 is illustrated in FIG. 4 as providing the third current ($I_3$) to the resonant emitter 260 in three-phases, but in other aspects, more or fewer than three phases may be used.

The first rotating assembly 420 is connected to one shaft 160 of the turbine engine 100, and the magnetic assembly 410 and second rotating assembly 440 are connected to a second shaft 160 of the turbine engine 100. Due to the difference in rotational speeds of each shaft 160 when the turbine engine 100 is in operation, the first rotating assembly 420 rotates at the differential speed relative to the magnetic assembly 410 and the second rotating assembly 440. Because the magnetic assembly 410 and the second rotating assembly 440 are connected to the same shaft 160, the magnetic assembly 410 and the second rotating assembly 440 are stationary relative to one another.

The second rotating assembly 440 is arranged in magnetic contact, but not physical contact, with a stationary assembly 450 via the resonant emitter 260 and the resonant receiver 340. The stationary assembly 450 is disposed on (or through) the enclosure 120 of the turbine engine 100, and as such, remains stationary relative to the rotating shafts 160 and the EM components connected thereto. The stationary assembly 450 includes the resonant receiver 340 and a power control unit 350 (also referred to as a PCU) that physically connects the stationary assembly 450 to an electrical bus or other power distribution system for the vehicle. The resonant emitter 260 and resonant receiver 340, which are discussed in greater detail in regard to FIG. 5, respectively generate and receive a high-frequency magnetic field at a predefined resonant frequency to produce a power output to the power control unit 350 and the vehicle.

Figure 5:
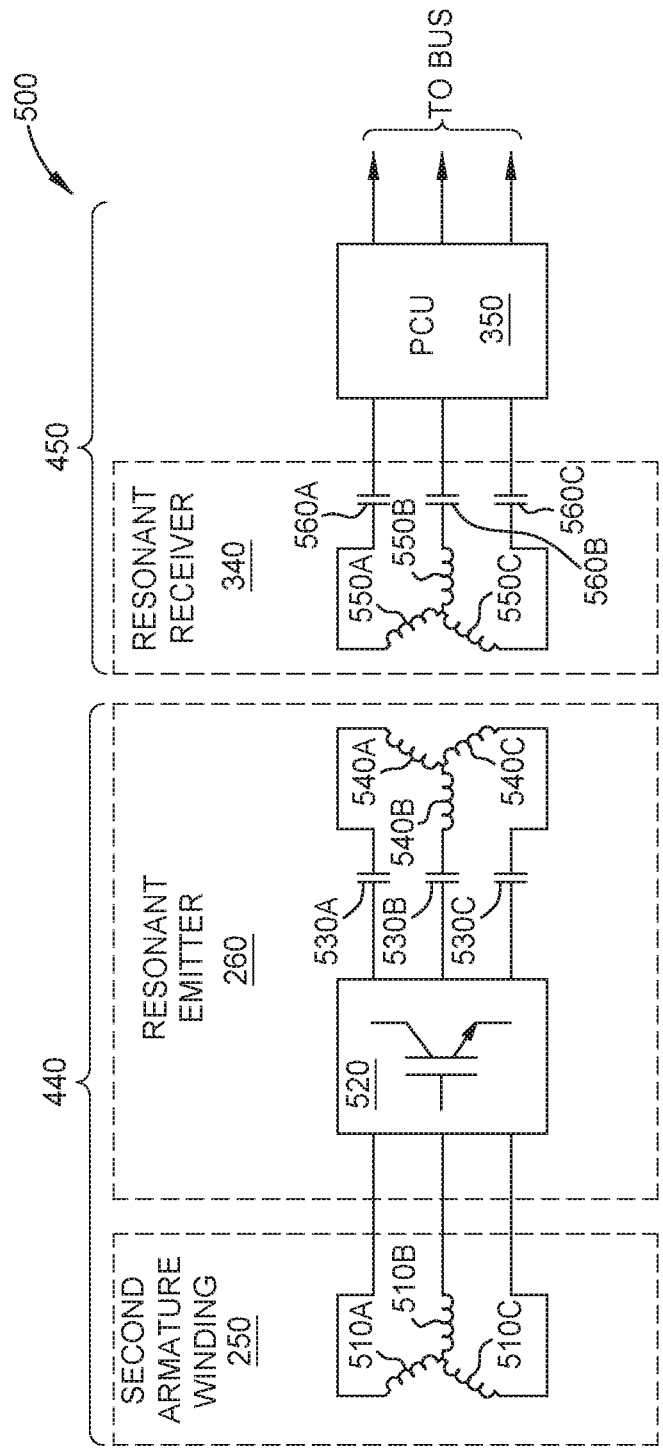
FIG. 5 is a circuit diagram detailing the resonant emitter and resonant receiver, according to aspects of the present disclosure.

FIG. 5 is a circuit diagram 500 detailing a three-phase example of the resonant emitter 260 and resonant receiver 340, according to aspects of the present disclosure. The second armature winding 250 includes a plurality of receiving windings 510A-C (generally, receiving winding 510) that each produce one phase of power from the received second magnetic field 320. In aspects using more or fewer than three phases of power, a corresponding number of receiving windings 510 are used. The power is carried from the receiving windings 510 to a high frequency converter 520, such as, for example, one or more insulated-gate bipolar transistors (IGBT), Metal oxide semiconductor field effect transistors (MOSFET), or other controlled switching devices, to increase the frequency of the power to generate the third magnetic field 330 at a predefined frequency. The predefined frequency is greater than the difference between the rotational speeds of the shafts 220 to which the resonant emitter 260 and other components of the electrical extractor 111 are connected, and is tuned for power transfer efficiency over the air gap between the resonant emitter 260 and the resonant receiver 340. Emitter capacitors 530A-C (generally, emitter capacitor 530) are disposed on each output from the high frequency converter 520 to act as high-pass filters for the several phases of power used to generate the third magnetic field 330 by a corresponding number of phase windings 540A-C (generally, phase winding 540).

Each phase winding 540 receives one phase of high frequency power, and generates one phase of the third magnetic field 330, which is received by a corresponding receiver winding 550A-C (generally, receiver winding 550) of the multiphase armature of the resonant receiver 340. Each receiver winding 550 is connected to the power control unit 350 via a corresponding receiver capacitor 560A-C (generally, receiver capacitor 560), which acts as a high-pass filter between the associated receiver winding 550 and the power control unit 350. The power control unit 350 may convert the power from AC to DC (or DC to AC), increase or reduce the number of phases of the power, make or break an electrical connection to the bus, raise or lower a voltage of the power, raise or lower the frequency of the power, and the like to condition the power for consumption or storage by the vehicle.

Although shown in FIG. 5 as an LC (Inductive and Capacitive) circuit in a series arrangement, in other aspects the circuitry of the resonant emitter 260 and resonant receiver 340 may include RLC (Resistive, Inductive, and Capacitive) elements in other arrangements that allow for a resonant magnetic linkage between the resonant emitter 260 and the resonant receiver 340 when the resonant emitter 260 is powered. Other examples include parallel LC circuits, RLC circuits, actively tuned resonant circuits, etc.

Figure 6:
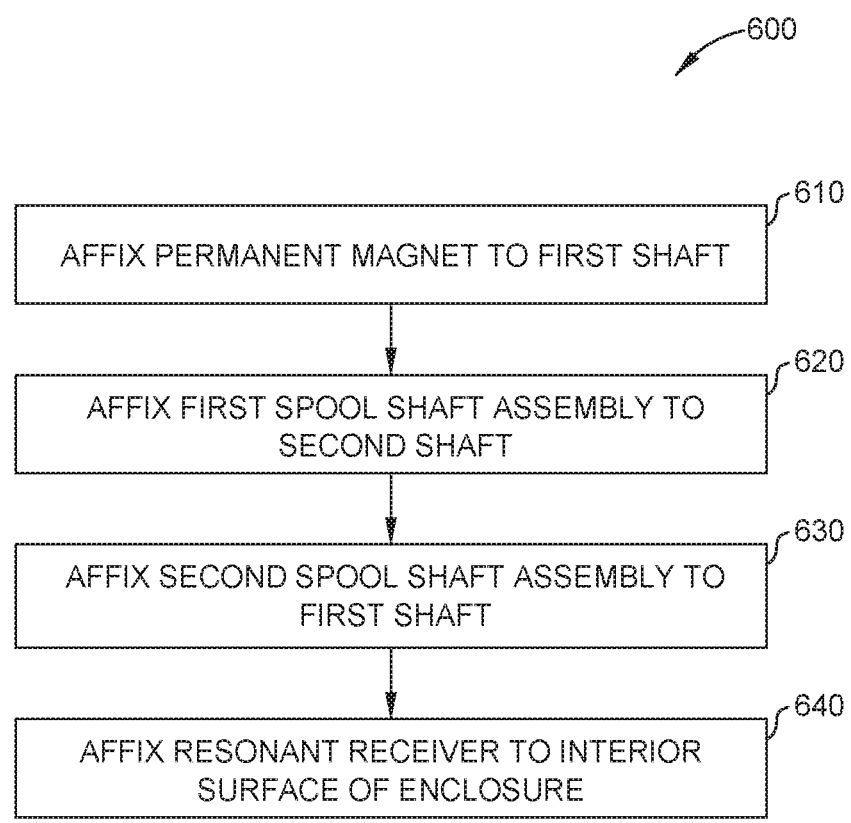
FIG. 6 is a flowchart of a method of construction for an electrical generator, according to aspects of the present disclosure.

FIG. 6 is a flowchart of a method 600 of construction for an electrical generator 110, according to aspects of the present disclosure. Method 600 may be performed during initial assembly of a turbine engine 100, during retrofit or repair of a turbine engine 100, or as a pre-assembly operation for components of a turbine engine 100.

Method 600 begins with block 610, where a fabricator affixes a permanent magnet 210 to a first shaft 220 for a turbine engine 100. In various aspects, the first shaft 220 may be the lower-pressure spool shaft 220B or the higher-pressure spool shaft 220A and the permanent magnet 210 is positioned at a region of the first shaft 220 intended to interface with a second shaft 220 in the turbine engine 100.

In various aspects, block 610 may be repeated to allow a fabricator to affix a secondary permanent magnet 210 to a secondary first shaft 220 (e.g., at a different location on a shaft 220 in the primary electrical generator 110) for use in a secondary electrical generator 110 in a three-shaft turbine engine 100.

At block 620, a fabricator affixes a first spool shaft assembly 270A to the second shaft 220 at a region intended to interface with the first shaft 220. For example, the fabricator affixes the first spool shaft assembly 270A to a lower-pressure spool shaft 220B when the permanent magnet 210 is affixed to the higher-pressure spool shaft 220A, but affixes the first spool shaft assembly 270A to a higher-pressure spool shaft 220A when the permanent magnet 210 is affixed to the lower-pressure spool shaft 220B. The interface region between the first and second shafts defines an area that one of the shafts extends from the other and is free of fans or blades of the corresponding compressors 170.

In various aspects, block 620 may be repeated to allow a fabricator to affix a secondary first spool shaft assembly 270A to a secondary second shaft 220 (e.g., a third spool shaft 160C) for use in a secondary electrical generator 110 in a three-shaft turbine engine 100.

The first spool shaft assembly 270A includes a first armature winding, the first electromagnetic, and spacers. The spacers arrange the first armature winding and first electromagnet to position the first armature winding in the first magnetic field 310 and to separate the first magnetic field 310 from the second magnetic field 320 when the shafts 160 rotate relative to one another during operation of the turbine engine 100.

At block 630, a fabricator affixes a second spool shaft assembly 270B to the first shaft 220. The second spool shaft assembly 270B includes a second armature winding, a second electromagnet, and spacers. The spacers locate the second armature winding in the second magnetic field 320 and arrange the second armature winding and second electromagnet to separate the third magnetic field 330 from the first magnetic field 310 and the second magnetic field 320 when the shafts 220 rotate relative to one another during operation of the turbine engine 100. In various aspects, the permanent magnet 210 is included as a component of the second spool shaft assembly 270B, and block 610 is performed simultaneously with block 630.

In various aspects, block 630 may be repeated to allow a fabricator to affix a secondary second spool shaft assembly 270B to a secondary first shaft 220 (e.g., a second spool shaft 160B) for use in a secondary electrical generator 110 in a three-shaft turbine engine 100.

At block 640, a fabricator affixes a resonant receiver 340 to an interior surface of the enclosure 120 for the turbine engine 100 in relation to the interface region between the two shafts 220 and where the third magnetic field 330 is produced during operation of the turbine engine 100. In various aspects using a three-shaft design, block 640 may be repeated to allow a fabricator to affix a secondary resonant receiver 340 to a secondary location on the interior surface of the enclosure 120, corresponding to the interface region between the two shafts 220 used by the secondary electrical generator 110 and where the secondary third magnetic field 330 is produced during operation of the turbine engine 100. Method 600 may then conclude.

Figure 7:
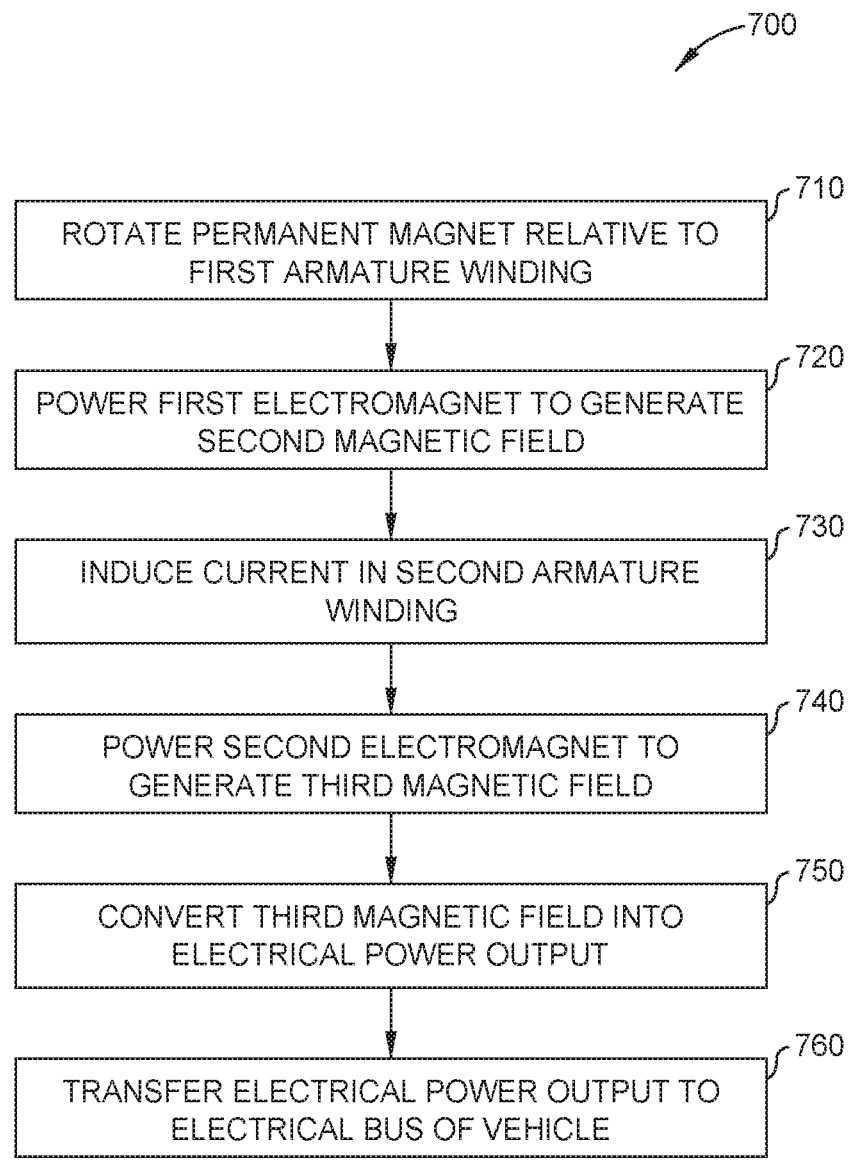
FIG. 7 is a flowchart of a method for extracting electrical energy from a turbine engine, according to aspects of the present disclosure.

FIG. 7 is a flowchart of a method 700 for extracting electrical energy from a turbine engine 100, according to aspects of the present disclosure. As will be appreciated, in a three-shaft turbine engine 100, method 700 may be performed twice in parallel—extracting electrical power from the differential rotation of a primary electrical generator 110 and a secondary electrical generator 110 located on the interfaces between different pairs of shafts 160.

Method 700 begins at block 710, where an operator of the turbine engine 100 causes the permanent magnet 210 attached to a first shaft 160A of a turbine engine 100 to rotate relative to a second shaft 160B of the turbine engine 100. The operator may cause the relative rotation by engaging the turbine engine 100 to produce thrust for a vehicle; inducing rotational energy on the shafts 160 by the combustion of fuel in a combustion chamber and expelling the exhaust through a turbine region, thus causing the turbines 180 to rotate the corresponding shafts 160. The permanent magnet 210, which may be part of an array of permanent magnets 210 arranged radially around the first shaft 160A, emits a first magnetic field 310. When rotated, the first magnetic field 310 induces a first current ($I_1$) in a first armature winding that is disposed on the second shaft 160B as a multiphase alternating current.

In various aspects, the "first" shaft 160A may refer to one of a high-pressure shaft or a low-pressure shaft in a two-shaft turbine engine 100, and the "second" shaft 160B may refer to the other shaft. Similarly, in a three-shaft turbine engine 100, the "first" shaft 160A may refer to a high-pressure shaft or a low-pressure shaft, in which case the "second" shaft 160B refers to a medium-pressure shaft, or the "first" shaft 160A may refer to the medium-pressure shaft, in which case the "second" shaft 160B may refer to either the high-pressure shaft or the low-pressure shaft.

At block 720, the second current ($I_2$) powers a first electromagnet (e.g., a main field winding 240) that is disposed on the second shaft 160B to generate a second magnetic field 320.

At block 730, the second magnetic field 320 induces a third current ($I_3$) in a second armature winding 250 disposed on the first shaft 160A as a multiphase alternating current.

At block 740, the third current ($I_3$) powers a second electromagnet (e.g., a resonant emitter 260) to generate a third magnetic field 330 at or above a predefined frequency. In various aspects, the predefined frequency is tuned to the characteristics of the turbine engine 100, including, but not limited to, the distance between the resonant emitter 260 and the resonant receiver 340, the relative location in space of the third magnetic field 330 to other magnetic fields in the electrical generator 110, the relative location of a primary electrical generator 110 to a secondary electrical generator 110, the rotational speeds of the shafts, etc. In various aspects, the predefined frequency is set high (e.g., at least 10 kHz) to thereby reduce losses when wirelessly transferring power via the second electromagnet to the resonant receiver 340.

At block 750, a resonant receiver 340, which is disposed on an inner surface of the enclosure 120, converts the rotating third magnetic field 330 into an electrical power output. In various aspects, the electrical power output is a fourth current (4) that is provided as a multiphase alternating current (AC) electrical power output, but in other aspects, the electrical output may be single phase and/or direct current (DC), depending on the power consumption characteristics of the vehicle.

At block 760, the resonant receiver 340 transfers the power to an electrical bus for use and/or storage by the vehicle. In various aspects, the resonant receiver 340 transfers the power output to the bus via a power control unit 350, which may condition the power, convert the power from AC to DC (or DC to AC), reduce or increase the number of phases of the power, make or break an electrical connection to the bus, raise or lower a voltage of the power, raise or lower the frequency of the power, and the like.

Method 700 may continue as long as the operator continues to rotate the first and second shafts.

In the current disclosure, reference is made to various aspects. However, it should be understood that the present disclosure is not limited to specific described aspects. Instead, any combination of the following features and elements, whether related to different aspects or not, is contemplated to implement and practice the teachings provided herein. Additionally, when elements of the aspects are described in the form of "at least one of A and B," it will be understood that aspects including element A exclusively, including element B exclusively, and including element A and B are each contemplated. Furthermore, although some aspects may achieve advantages over other possible solutions and/or over the prior art, whether or not a particular advantage is achieved by a given aspect is not limiting of the present disclosure. Thus, the aspects, features, aspects and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects described herein may be embodied as a system, method or computer program product. Accordingly, aspects may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects described herein may take the form of a computer program product embodied in one or more computer readable storage medium (s) having computer readable program code embodied thereon.

Aspects of the present disclosure are described herein with reference to flowchart illustrations and/or block diagrams of methods, apparatuses (systems), and computer program products according to aspects of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various aspects of the present disclosure. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A system, comprising:
   a permanent magnet (210) that emits a first magnetic field (310) and is disposed on a first spool shaft (160) of a turbine engine (100);
   a first armature winding (230) connected to a second spool shaft (160) of the turbine engine such that the first armature winding is positioned within the first magnetic field;
   a main field winding (240) disposed on the second spool shaft such that the main field winding generates a second magnetic field (320) that rotates as the first spool shaft rotates relative to the second spool shaft;
   a second armature winding (250) disposed on the first spool shaft, the second armature winding being positioned to receive the second magnetic field and provide a resonant emitter (260) with an electrical power input to generate a third magnetic field (330) of at least a predefined frequency when the first spool shaft rotates relative to the second spool shaft; and
   a resonant receiver (340) disposed on an enclosure (120) of the turbine engine, positioned to receive the third magnetic field and convert the third magnetic field into an electrical power output.

2. The system of claim 1, wherein the first spool shaft is a higher-pressure shaft (220A), wherein the second spool shaft is a lower-pressure shaft (220B), and wherein the higher-pressure shaft rotates at a first speed that is greater than a second speed at which the lower-pressure shaft rotates.

3. The system of claim 1, wherein the first spool shaft is a lower-pressure (220B) shaft, wherein the second spool shaft is a higher-pressure shaft (220A), and wherein the higher-pressure shaft rotates at a first speed that is greater than a second speed at which the lower-pressure shaft rotates.

4. The system of claim 1, further comprising:
a rectifier (430) disposed on the second spool shaft between the first armature winding and the main field winding that converts multiphase Alternating Current from the first armature winding generated by the first magnetic field into an electrical power input for the main field winding to generate the second magnetic field.

5. The system of claim 1, further comprising:
a high frequency converter (520) disposed between the second armature winding and the resonant emitter that provides the electrical power input at a higher frequency to the resonant emitter than the second magnetic field is received by the second armature winding.

6. The system of claim 5, wherein the higher frequency is greater than a difference in rotational speed between the first spool shaft and the second spool shaft and is based on a power transfer efficiency between the resonant emitter and the resonant receiver.

7. The system of claim 1, wherein the electrical power output includes a plurality of electrical phases based on a number of phases defined in the second armature winding.

8. The system of claim 1, further comprising a power control unit (350) disposed in the enclosure and connected to a power distribution bus for a vehicle.

9. A turbine engine (100), comprising:
an enclosure (120), defining:
an air intake (121) at an upstream end;
a compression section (122) downstream of the air intake;
a combustion section (123) downstream of the compression section;
a turbine section (124) downstream of the combustion section; and
an exhaust (125) at a downstream end;
a first shaft (160) coupled with a first compressor (170) of the compression section and with a first turbine (180) of the turbine section, wherein the first shaft is configured to rotate at a first rotational speed;
a second shaft (160) coupled with a second compressor (170) of the compression section and with a second turbine (180) of the turbine section and running coaxially with the first shaft, wherein the second shaft is configured to rotate at a second rotational speed;
a first armature winding (230), connected to one of the first shaft and the second shaft;
a permanent magnet (210), emitting a first magnetic field (310) that is configured to rotate relative to the first armature winding at a differential rotational speed corresponding to a difference between the first rotational speed and the second rotational speed and induce a first current in the first armature winding;
a first electromagnet (240), connected to the first armature winding, configured to emit a second magnetic field (320) when powered by the first current;
a second armature winding (250), connected to a different one of the first shaft and the second shaft than the first armature winding, configured to rotate relative to the first electromagnet at the differential rotational speed and to have a second current induced on the second armature winding by the second magnetic field;
a resonant emitter (260), connected to the second armature winding, configured to generate a third magnetic field (330) of at least a predefined frequency when powered by the second current; and
a resonant receiver (340) disposed on the enclosure of the turbine engine, positioned to receive the third magnetic field and convert the third magnetic field into an electrical power output.

10. The turbine engine of claim 9, further comprising:
a third shaft (160C) coupled with a third compressor (170C) of the compression section downstream of the first compressor and the second compressor and with a third turbine (180C) of the turbine section upstream of the first turbine and the second turbine, wherein the third shaft runs coaxially to the second shaft, and is configured to rotate at a third rotational speed that is greater than the first rotational speed and the second rotational speed.

11. The turbine engine of claim 10, further comprising:
a secondary first armature winding (230), connected to one of the third shaft and the second shaft;
a secondary permanent magnet (210), emitting a secondary first magnetic field (310) that is configured to rotate relative to the secondary first armature winding at a secondary differential rotational speed corresponding to a secondary difference between the third rotational speed and the second rotational speed and induce a secondary first current in the secondary first armature winding;
a secondary first electromagnet (240), connected to the secondary first armature winding, configured to emit a secondary second magnetic field (320) when powered by the secondary first current;
a secondary second armature winding (250), connected to a different one of the third shaft and the second shaft than the secondary first armature winding, configured to rotate relative to the secondary first electromagnet at the secondary differential rotational speed and to have a secondary second current induced on the secondary second armature winding by the secondary second magnetic field;
a secondary resonant emitter (260), connected to the secondary second armature winding, configured to generate a secondary third magnetic field (330) of at least a secondary predefined frequency when powered by the secondary second current; and
a secondary resonant receiver (340) disposed on the enclosure of the turbine engine, positioned to receive the secondary third magnetic field and convert the secondary third magnetic field into a secondary electrical power output.

12. The turbine engine of claim 9, further comprising:
a third shaft (160) coupled with a third compressor (170) of the compression section upstream of the first compressor and the second compressor and with a third turbine (180) of the turbine section downstream of the first turbine and the second turbine, wherein the third shaft runs coaxially to the second shaft, and is configured to rotate at a third rotational speed that is less than the first rotational speed and the second rotational speed.

13. The turbine engine of claim 12, further comprising:
a secondary first armature winding (230), connected to one of the third shaft and the second shaft;
a secondary permanent magnet (210), emitting a secondary first magnetic field (310) that is configured to rotate relative to the secondary first armature winding at a secondary differential rotational speed corresponding to a secondary difference between the third rotational speed and the second rotational speed and induce a secondary first current in the secondary first armature winding;
a secondary first electromagnet (240), connected to the secondary first armature winding, configured to emit a secondary second magnetic field (320) when powered by the secondary first current;
a secondary second armature winding (250), connected to a different one of the third shaft and the second shaft than the secondary first armature winding, configured to rotate relative to the secondary first electromagnet at the secondary differential rotational speed and to have a secondary second current induced on the secondary second armature winding by the secondary second magnetic field;
a secondary resonant emitter (260), connected to the secondary second armature winding, configured to generate a secondary third magnetic field (330) of at least a secondary predefined frequency when powered by the secondary second current; and
a secondary resonant receiver (340) disposed on the enclosure of the turbine engine, positioned to receive the secondary third magnetic field and convert the secondary third magnetic field into a secondary electrical power output.

14. The turbine engine of claim 9, further comprising:
a nacelle (130), defining a bypass flow chamber (131) in which the enclosure is disposed; and
a transfer cable (140), disposed in the bypass flow chamber running from the enclosure to electrically connect the resonant receiver to a power distribution bus for a vehicle.

15. The turbine engine of claim 14, further comprising:
a power control unit (350) disposed within the bypass flow chamber externally to the enclosure and that is electrically connected between the resonant receiver and the transfer cable.

16. The turbine engine of claim 15, wherein the resonant emitter further comprises:
a multiphase armature winding with a predefined number of phase windings (540), to emit the third magnetic field in a corresponding number of phases; and
a high frequency converter (520), located between the multiphase armature winding and the second armature winding, configured to up convert the second current to at least the predefined frequency.

17. A method, comprising:
rotating (710) a permanent magnet (210), emitting a first magnetic field, attached to a first shaft (220) of a turbine engine (100) about the first shaft and relative to a second shaft (220) of the turbine engine to induce a multiphase alternating current in a first armature winding (230) disposed on the second shaft of the turbine engine;
powering (720), via the multiphase alternating current, a first electromagnet (240) disposed on the second shaft to generate a second magnetic field;
inducing (730), by the second magnetic field, a single-phase direct current in a second armature winding (260) disposed on the first shaft;
powering (740), via the single-phase direct current, a resonant emitter (260) to generate a third magnetic field at or above a predefined frequency; and
converting (750) the third magnetic field as rotating via a resonant receiver (340) disposed on an interior surface of an enclosure (120) of the turbine engine into an electrical power output.

18. The method of claim 17, further comprising:
transferring (760) the electrical power output to an electrical bus of a vehicle.

19. A method (600), comprising:
affixing (610), at an interface region between a first shaft (220) and a second shaft (220) of a turbine engine (100), a permanent magnet (210) to the first shaft;
affixing (620) a first spool shaft assembly (270A), including a first armature winding (230) and a first electromagnet (240), to the second shaft to place the first armature winding within a first magnetic field emitted by the permanent magnet;
affixing (630) a second spool shaft assembly (270B), including a second armature winding (250) and a resonant emitter (260), to the first spool shaft relative to the second spool shaft assembly such that the second armature winding is located in relation to the first electromagnet to receive a second magnetic field when rotated relative to the first electromagnet; and
affixing (640) a resonant receiver (340) to an interior surface of an enclosure (120) of the turbine engine in relation to the resonant emitter to receive a third magnetic field when the resonant emitter radiates the third magnetic field.

20. The method of claim 19, wherein the second spool shaft assembly includes the permanent magnet and the second shaft is a lower pressure shaft (220B) that protrudes from the first shaft at the interface region.

* * * * *